(12) United States Patent
Lee et al.

(10) Patent No.: US 7,289,294 B2
(45) Date of Patent: Oct. 30, 2007

(54) PARTICLE REMOVER FOR DATA STORAGE DEVICE AND RAMP HAVING THE PARTICLE REMOVER

(75) Inventors: Chul-woo Lee, Seongnam-si (KR); Ki-tag Jeong, Gyeonggi-do (KR); Tae-soo Kim, Suown-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 449 days.

(21) Appl. No.: 10/852,205

(22) Filed: May 25, 2004

(65) Prior Publication Data

US 2004/0240112 A1  Dec. 2, 2004

(30) Foreign Application Priority Data

May 26, 2003  (KR) .............. 10-2003-0033350

(51) Int. Cl.
*G11B 5/54* (2006.01)
*G11B 33/14* (2006.01)

(52) U.S. Cl. .................. 360/97.03; 360/254.7
(58) Field of Classification Search ............. 360/97.02, 360/97.03, 254.7, 98.01
See application file for complete search history.

(56) References Cited

U.S. PATENT DOCUMENTS

| | | | | |
|---|---|---|---|---|
| 5,134,530 | A * | 7/1992 | Hall ........................ | 360/97.03 |
| 6,097,568 | A * | 8/2000 | Ekhoff ..................... | 360/97.02 |
| 6,339,517 | B1 * | 1/2002 | Cheong .................... | 360/128 |
| 6,549,365 | B1 * | 4/2003 | Severson .................. | 360/97.02 |
| 6,590,738 | B2 * | 7/2003 | Kim ......................... | 360/97.02 |
| 6,882,501 | B2 * | 4/2005 | Machcha et al. ......... | 360/97.03 |
| 6,903,899 | B2 * | 6/2005 | Sakata et al. ............ | 360/97.03 |
| 6,972,926 | B1 * | 12/2005 | Codilian .................. | 360/97.02 |
| 2002/0015255 | A1 * | 2/2002 | Tadepalli et al. ........ | 360/97.02 |
| 2002/0036862 | A1 * | 3/2002 | Tsang et al. ............. | 360/97.02 |
| 2005/0286171 | A1 * | 12/2005 | Kim et al. ............... | 360/254.7 |
| 2006/0256478 | A1 * | 11/2006 | Hayakawa ............... | 360/254.7 |

FOREIGN PATENT DOCUMENTS

| | | |
|---|---|---|
| JP | 63-269392 | 11/1988 |
| JP | 2001-23347 | 1/2001 |
| JP | 2001-101814 | 4/2001 |
| JP | 2001-229517 | 8/2001 |
| KR | 1999-13429 | 2/1999 |
| KR | 1020020068744 | 8/2002 |

OTHER PUBLICATIONS

Korean Patent Office Action, corresponding application No. 10-2003-0033350.
Japanese Office Action issued Apr. 18, 2006 in Japanese Patent Application 2004-154314 which corresponds to U.S. Appl. No. 10/852,205.

* cited by examiner

*Primary Examiner*—Jefferson Evans
(74) *Attorney, Agent, or Firm*—Staas & Halsey LLP

(57) ABSTRACT

A particle remover for a data storage device that removes particles attached to a surface of a disk, the particle remover including a fixed portion installed on a base plate of the data storage device; and pressure plates extending from the fixed portion toward the disk and respectively overlapping an upper surface and a lower surface of the disk, and having disk opposing surfaces with shapes that are convex toward the disk to form a space between the disk opposing surfaces and the surface of the disk that becomes narrower and then wider along a rotational direction of the disk.

19 Claims, 6 Drawing Sheets

PARTICLE REMOVER FOR DATA STORAGE DEVICE AND RAMP HAVING THE PARTICLE REMOVER

CROSS-REFERENCE TO RELATED APPLICATIONS

This application claims the benefit of Korean Patent Application No. 2003-33350, filed on May 26, 2003, in the Korean Intellectual Property Office, the disclosure of which is incorporated herein by reference.

BACKGROUND OF THE INVENTION

1. Field of the Invention

The present invention relates to a data storage device such as a hard disk drive (HDD), and, more particularly, to a particle remover effectively removing particles on a surface of a disk, and a ramp having the same.

2. Description of the Related Art

Among the various computer storage devices, a hard disk drive (HDD) is used to reproduce stored data on a disk or to record data on the disk using a read/write head. In the HDD, the head, when being lifted to a predetermined height from a recording surface of the rotating disk, moves to desired locations by an actuator.

When the HDD does not operate, that is, when the disk stops rotating, the head is parked in an area outside the recording surface of the disk so as not to collide with the recording surface. This head parking system can be mainly classified as a contact start stop (CSS) system and a ramp loading system. The CSS system includes a parking zone, which does not allow data recording in an inner circumference of the disk to which the head is moved. The ramp loading system includes a ramp installed outside the disk and the head is parked on the ramp.

The CSS type of head parking system has a disadvantage in that a data storage space is reduced due to the parking zone, which is formed in the inner circumference of the disk. Accordingly, to meet the demand for high data recording density, the ramp loading type of parking system, which provides a larger storage space without forming the parking zone on a surface of the disk, is widely used.

FIG. 1 is a plan view schematically illustrating a conventional HDD with the ramp loading type of head parking system. FIG. 2 is a perspective view of a magnified image of the ramp shown in FIG. 1.

Referring to FIGS. 1 and 2, the conventional HDD includes a spindle motor 12 installed on a baseplate 10, at least one disk 20 installed on the spindle motor 12, and an actuator 30 moving a slider 34, which includes a read/write head for reproducing and recording data to a predetermined location on the disk 20. The actuator 30 has a swing arm 32 coupled to an actuator pivot 31 installed on the baseplate 10 so that the swing arm 32 can rotate, a suspension 33 installed on one end of the swing arm 32 to support the slider 34 and elastically bias the slider 34 toward the surface of the disk 20, and a voice coil motor (VCM) to rotate the swing arm 32. The VCM includes a VCM coil 36 coupled to the other end of the swing arm 32, a lower yoke 37 installed on a lower portion of the VCM coil 36, and a magnet 38 attached to an upper portion of the lower yoke 37. In addition, the VCM may further include an upper yoke (not shown) installed on an upper portion of the VCM coil 36 and a magnet (not shown) attached to a lower surface of the upper yoke.

The VCM having the above structure is controlled by a servo-control system and rotates the swing arm 32 in a direction according to Fleming's rule via interactions of an electric current input into the VCM coil 36 and a magnetic field formed by the magnet 38. That is, if the power of the HDD is turned on and the disk 20 starts rotating in a direction indicated by arrow D, the VCM rotates the swing arm 32 counterclockwise (or in a direction indicated by arrow A) and moves the slider 34, including the read/write head, toward the recording surface of the disk 20. The slider 34 is lifted to a predetermined height from the surface of the disk 20 by a lift force generated by the rotating disk 20, and, in this state, the head mounted on the slider 34 reproduces data from, or records data to the recording surface of the disk 20.

When the HDD does not operate (i.e., the disk 20 stops rotating), the head is parked in an area outside the recording surface of the disk 20 so as not to collide with the recording surface. This is achieved by installing a ramp 40 adjacent to the disk 20, and extending an end-tap 35 to an outer end of the suspension 33.

The ramp 40 includes a fixed portion 41 installed on the baseplate 10, a supporting portion 42 extending from the fixed portion 41 toward the disk 20 that overlaps an outer edge portion of the disk 20, and a support surface 43 supporting the end-tap 35. An end portion of the support surface 43 is inclined so that the end-tap 35 can be smoothly loaded and unloaded. The end-tap 35 usually has a shape that is convex toward the support surface 43 to reduce the contact area with the support surface 43.

When the HDD is turned off and the disk 20 stops rotating, the VCM rotates the swing arm 32 clockwise (in a direction indicated by arrow B), and thus, the end-tap 35 is unloaded from the disk 20 to the support surface 43 of the ramp 40. On the other hand, when the HDD is turned on and the disk 20 starts rotating, the end-tap 35 is loaded from the support surface 43 of the ramp 40 to the disk 20 by rotation of the swing arm 32.

As described above, when the head is parked on the ramp 40, the actuator 30 may rotate freely to move the head from the ramp 40 to the recording surface of the disk 20 when the disk 20 receives external shocks or when vibrations are applied to the disk drive. This may result in the head and/or the recording surface of the disk 20 being damaged because the head may contact the recording surface of the disk 20. Accordingly, there is a need to lock the actuator 30 so as not to freely rotate when the disk 20 stops rotating. Thus, a latch 50 for locking the actuator 30 is provided.

A filter 60 is installed adjacent to the disk 20 to filter particles contained in air flowing inside the disk drive.

In the ramp loading type of HDD as presented above, when the end-tap 35 moves to the disk 20 or to the support surface 43 of the ramp 40, sliding friction is likely to occur between the end-tap 35 and the support surface 43 of the ramp 40. Over time, such friction may cause the support surface 43 of the ramp 40, which is usually formed of plastics, to wear away, resulting in the formation of particles. FIG. 3 shows particles attached to the conventional end-tap 35. In addition, the suspension 33 of the actuator 30 or the slider 34 may have particles such as burrs that are formed during production. Any particles that fall onto the surface of the disk 20 attach to the surface of the disk 20, particularly to the outer edge of the disk 20 near the ramp 40, due to shocks occurring when loading and unloading the end-tap 35. The particles attached to the surface of the disk 20 are not easily removed in spite of the centrifugal force created by rotations of the disk 20. Although the filter 60 is generally installed in the HDD, the filter 60 is only able to filter particles contained in the flowing air inside the HDD and cannot remove particles attached to the surface of the disk 20. Therefore, such particles damage the surface of the disk 20 by colliding with the head when the disk 20 is rotating, corrupting the surface of the disk and spoiling the head.

An HDD with a squeeze plate is disclosed in Japanese Patent Publication No. 2001-101814. The squeeze plate restricts vibrations of the disk. However, the squeeze plate cannot remove particles attached to the surface of the disk.

SUMMARY OF THE INVENTION

To solve the above and/or other problems, the present invention provides a particle remover for a data storage device and a ramp having the particle remover that can easily remove particles on a surface of a disk.

According to an aspect of the present invention, there is provided a particle remover for a data storage device, the particle remover including a fixed portion installed on a base plate of the data storage device; and pressure plates extending from the fixed portion toward the disk and respectively overlapping an upper surface and a lower surface of the disk, and having disk opposing surfaces with shapes that are convex toward the disk to form a space between the disk opposing surfaces and the surface of the disk that becomes narrower and then wider along a rotational direction of the disk.

The disk opposing surfaces of the pressure plates have a streamlined shape.

The pressure plates overlap a surface of an outer edge of the disk. However, the pressure plates may be extended to approach an inner circumference of the disk. In the latter case, the pressure plates get wider from the inner to an outer circumference of the disk.

The pressure plates and the fixed portion are integrally formed by plastic injection molding.

The data storage device has a ramp to park a read/write head. In this case, the particle remover is installed near the ramp.

According to another aspect of the present invention, there is provided a ramp for a data storage device, the ramp including a fixed portion installed on a base plate of the data storage device; a supporting portion extending from the fixed portion toward the disk, overlapping an upper surface and a lower surface of an outer edge of the disk, and having a support surface contacting and supporting an end-tap of an actuator when rotation of the disk is stopped; and pressure plates extending toward the disk from the fixed portion and, overlapping the upper surface and the lower surface of the disk, and having disk opposing surfaces with shapes that are convex toward the disk to form a space between the disk opposing surfaces and the surface of the disk that becomes narrower and then wider along a rotational direction of the disk.

The pressure plates, the fixed portion, and the supporting portion are integrally formed by plastic injection molding.

According to another aspect of the present invention, there is provided a data storage device, including a disk and a particle remover adjacent to the disk to remove particles attached to a surface of the disk, the particle remover including a fixed portion installed on a base plate of the data storage device, pressure plates extending from the fixed portion toward the disk and respectively overlapping an upper surface and a lower surface of the disk, the pressure plates having disk opposing surfaces with respective shapes that are convex toward the disk to form a space between the disk opposing surfaces and the surface of the disk that becomes narrower and then wider along a rotational direction of the disk.

According to another aspect of the present invention, there is provided a data storage device, including data storage device, comprising: a plurality of disks; and a particle remover adjacent to the plurality of disks to remove particles attached to surfaces of the disks, the particle remover including a fixed portion installed on a base plate of the data storage device, pressure plates extending from the fixed portion toward the disks and being interleaved with the disks, the pressure plates having disk opposing surfaces with respective shapes that are convex toward the disks to form a space between each of the disk opposing surfaces and the surfaces of the disks that becomes narrower and then wider along a rotational direction of the disk.

The particle remover can easily remove particles on the surface of the disk and prevent damage and corruption of the surface of the disk and the head caused by particles, by changing the air pressure passing between the surface of the disk and the pressure plates.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
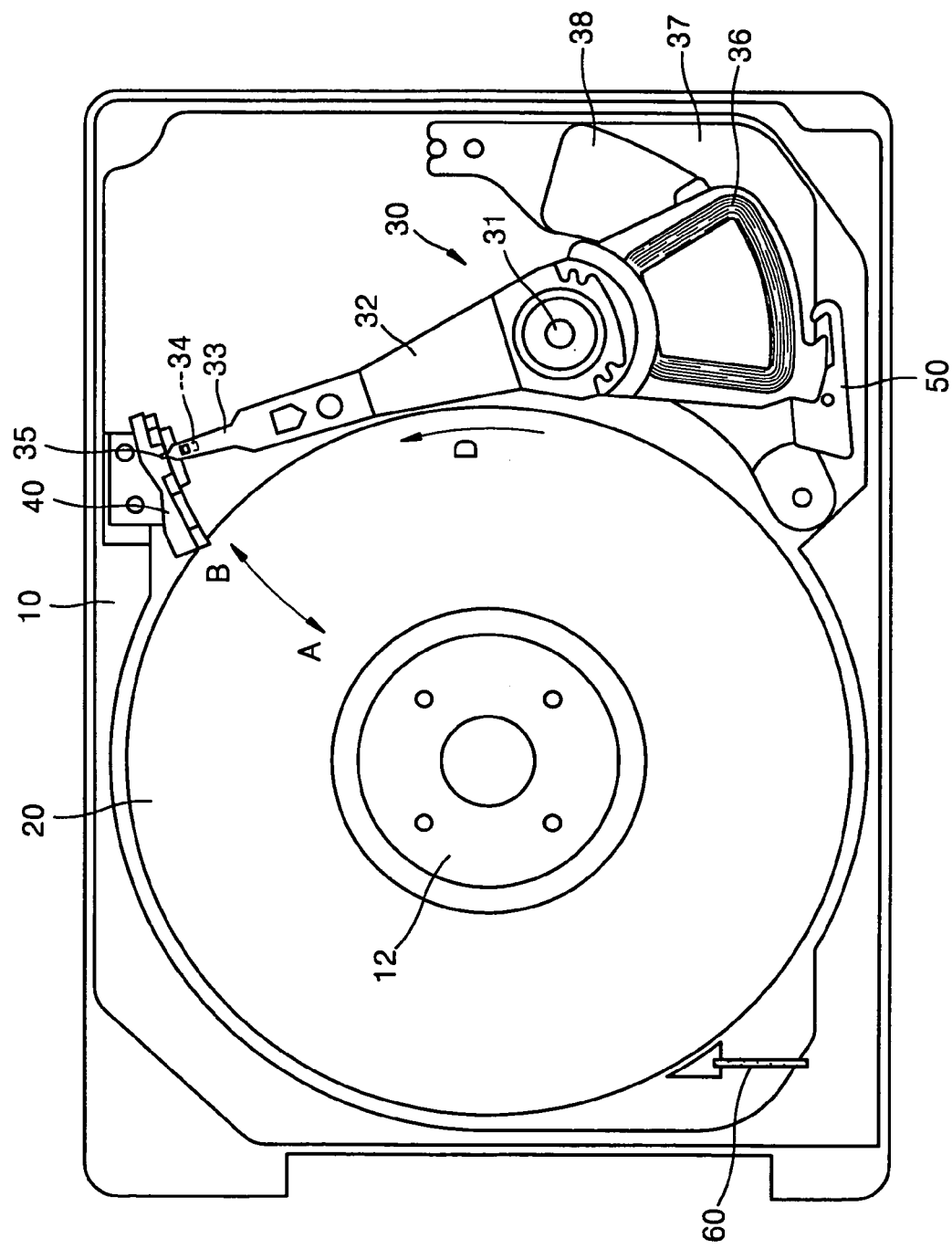
FIG. 1 is a plan view schematically illustrating a hard disk drive (HDD) with a conventional ramp loading type of head parking system.
Figure 2:
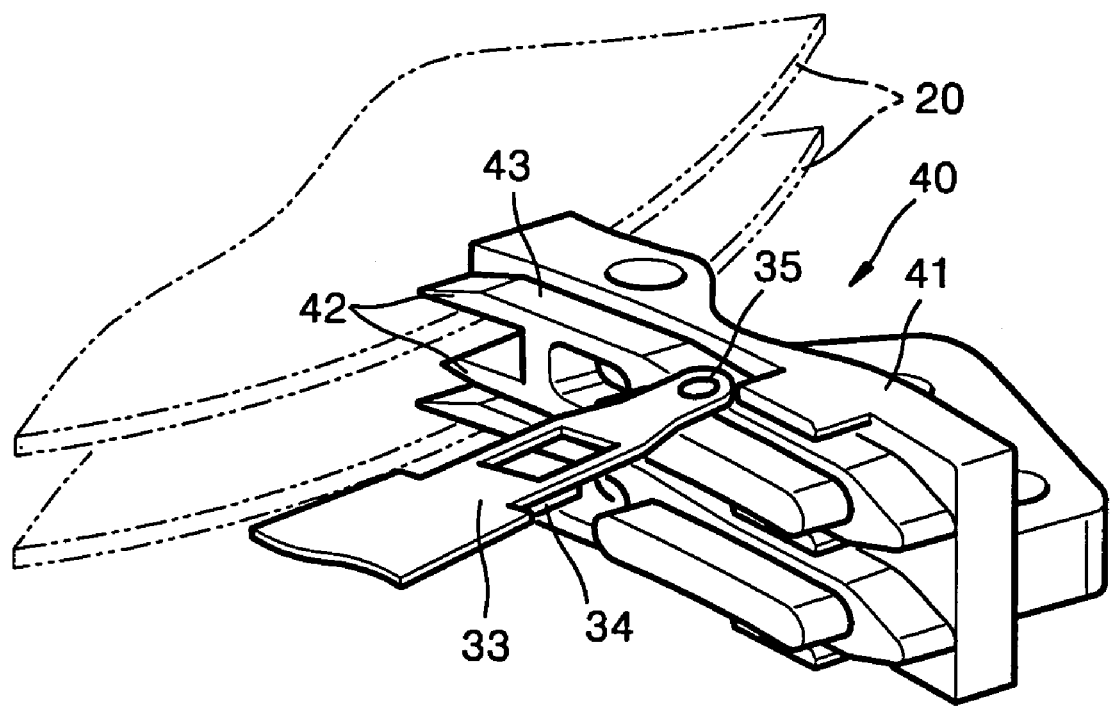
FIG. 2 is a perspective view of a magnified image of the ramp shown in FIG. 1.
Figure 3:
FIG. 3 is a microphotograph of particles on a portion of an end-tap shown in FIG. 2.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
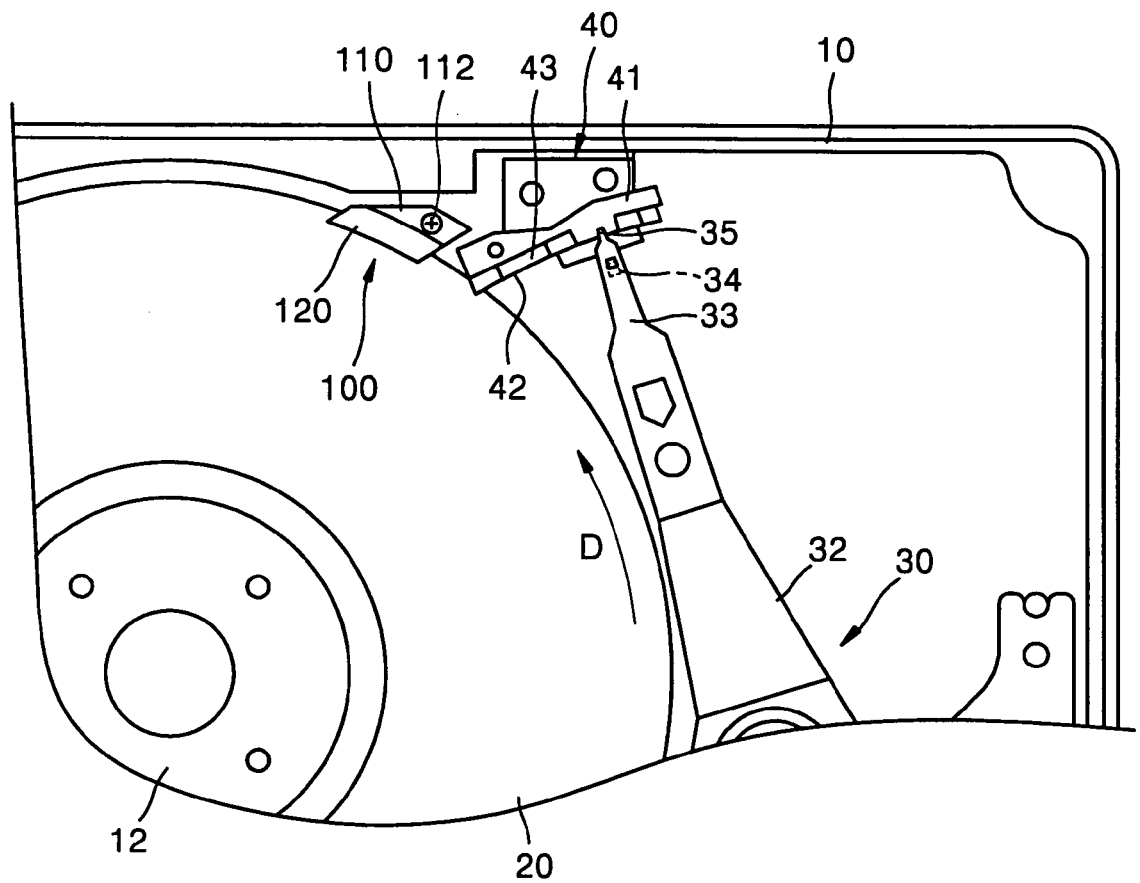
FIG. 4 is a plan view partially illustrating an HDD including a particle remover according to an embodiment of the present invention.
Figure 5:
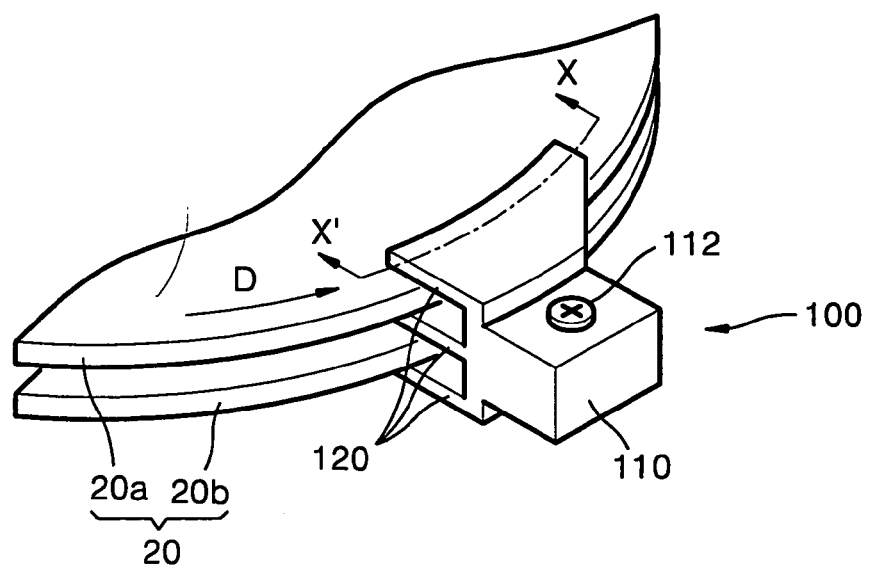
FIG. 5 is a perspective view of the particle remover shown in FIG. 4.
Figure 6:
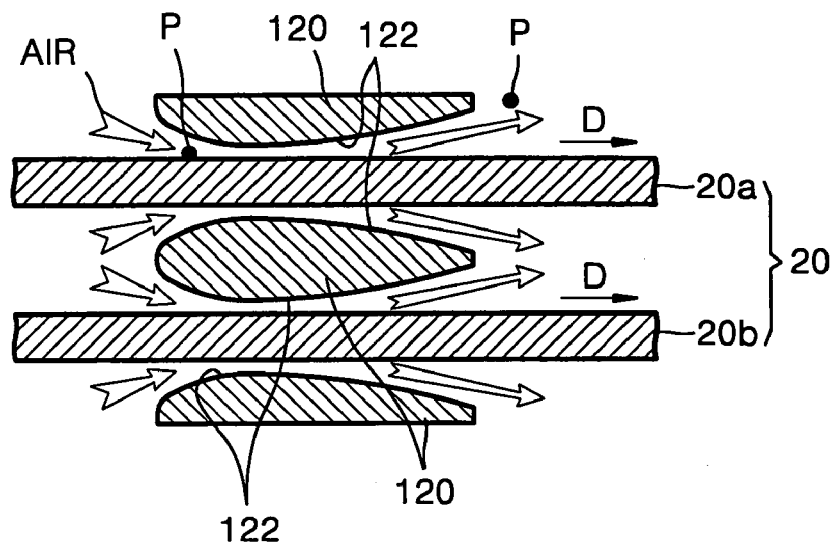
FIG. 6 is a cross-section of the particle remover cut along a line of X-X' as shown in FIG. 5.

FIG. 4 is a plan view partially illustrating a hard disk drive (HDD) including a particle remover according to an embodiment of the present invention. FIG. 5 is a perspective view of the particle remover shown in FIG. 4. FIG. 6 is a cross-section of the particle remover cut along a line X-X' in FIG. 5.

Referring to FIGS. 4 through 6, a particle remover 100 according to an embodiment of the present invention can be used with a data storage device such as an HDD including a ramp loading type of head parking system. In the ramp loading type of disk drive, a ramp 40 is installed adjacent to a disk 20 and when the disk drive stops operating, an end-tap 35 extending from an outer end of a suspension 33 of an actuator 30 is parked on a support surface 43 of a supporting portion 42 of the ramp 40.

In the ramp loading type of head parking system, many particles may become attached to a surface of the disk 20, especially to a surface of an outer edge portion of the disk 20 near the ramp 40. Such particles corrupt or damage the disk 20 and the head, and negatively affect the disk drive's performance.

The particle remover 100 according to the embodiment of the present invention includes a fixed portion 110 and pressure plates 120 that remove the particles from the surface of the disk 20.

The fixed portion 110, disposed near the outer edge portion of the disk 20, is fixed and installed on a baseplate 10 of the HDD by a screw 112 or by other coupling mechanisms.

The pressure plates 120 extending from the fixed portion 110 toward the disk 20 overlap the surface of the disk 20. Specifically, the pressure plates 120 of the particle remover 100 overlap the surface of the outer edge portion of the disk 20 according to the embodiment of the present invention. This disposition effectively removes particles because most of particles generated near the ramp 40 attach to the outer edge portion of the disk 20.

In addition, the pressure plates 120 overlap an upper and a lower surface of the disk 20, respectively. Thus, when two disks are in the HDD, the pressure plates 120 are each disposed on an upper disk 20a, below a lower disk 20b, and between the two disks 20a and 20b, respectively. If only one disk is in the HDD, the pressure plates 120 are disposed above and below the disk, respectively. Moreover, if three or more disks are in the HDD, the number of the pressure plates 120 provided is adjusted accordingly.

If at least two pressure plates 120 are installed, the pressure plates 120 may be integrally formed with the fixed portion 110 by plastic injection molding. By using this molding process, the manufacturing cost and complexity of manufacturing the particle remover 100 having the fixed portion 110 and a plurality of pressure plates 120 can be reduced, and the particle remover 100 becomes easier to handle and assemble. However, the particle remover 100 may be constructed by respectively forming the fixed portion 110 and the plurality of pressure plates 120, and then coupling the fixed portion 110 and the pressure plates 120 via a predetermined coupling mechanism.

As shown in FIG. 6, each disk opposing surface 122 of the pressure plates 120 is shaped to form a space between each disk opposing surface 122 and the surface of the disk 20 that becomes narrower and then wider along a rotational direction of the disk 20 (the direction indicated by arrow D).

That is, each disk opposing surface 122 of the pressure plates 120 has a shape that is convex toward the disk 20. Each disk opposing surface 122 of the pressure plates 120 may have two flat surfaces, each sloped in an opposite direction to one another. However, the two flat surfaces may have a streamlined shape to smooth air flow between the disk opposing surfaces 122 and the surface of the disk 20 and to reduce disk vibration due to turbulent air.

When the disk 20 starts rotating, air flows between the disk opposing surfaces 122 of the pressure plates 120 and the surface of the disk 20. The pressure of the incoming air increases because the space between the disk opposing surfaces 122 of the pressure plates 120 and the surface of the disk 20 becomes narrower. After passing through the narrower space, the speed at which the air is flowing becomes dramatically faster due to the lower pressure of the incoming air passing through a gradually wider space between the disk opposing surfaces 122 of the pressure plates 120 and the surface of the disk 20. Accordingly, the particles (P in FIG. 6) attached to the surface of the disk 20 can be easily removed. The removed particles that flow with the air are filtered by a filter 60 (shown in FIG. 1) installed inside the HDD.

As described above, according to the particle remover 100 in the embodiment of the present invention, the particles P on the surface of the disk 20, specifically, the particles attached to the surface of the outer edge portion of the disk 20, can be effectively removed because the air pressure changes between the pressure plates 120 and the surface of the disk 20, and the speed at which the air flows increases. Therefore, the reliability of the HDD improves because corruption and damage of the surface of the disk 20 and the head by the particles P are prevented.

The particle remover 100 is formed near the ramp 40 to effectively remove the particles that are generated mainly near the ramp 40.

Figure 7:
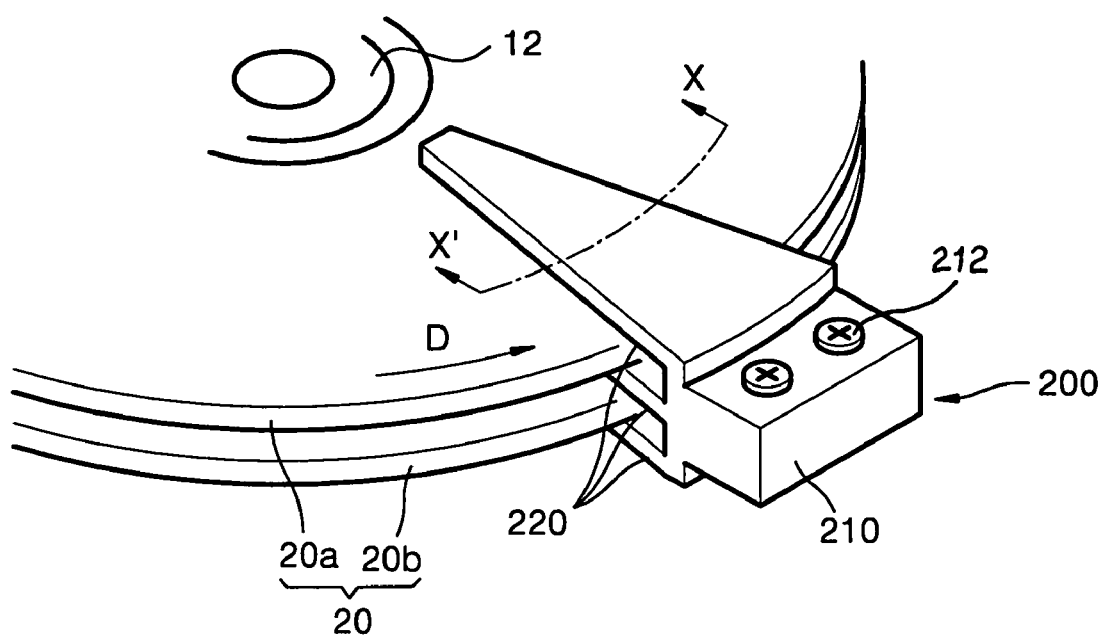
FIG. 7 is a perspective view of a particle remover according to a second embodiment of the present invention.

FIG. 7 is a perspective view of a particle remover according to a second embodiment of the present invention.

Referring to FIG. 7, similar to the first embodiment of the present invention, a particle remover 200 according to the second embodiment of the present invention includes a fixed portion 210 installed on the baseplate 10 of the HDD, and a plurality of pressure plates 220 extending from the fixed portion 210 toward the disk 20 and respectively overlapping an upper and a lower surface of the disk 20.

The fixed portion 210 is fixed and installed on the baseplate 10 by a screw 212 or another coupling mechanism, and the fixed portion 210 and the plurality of pressure plates 220 may be integrally formed together using plastic injection molding.

A cross-sectional shape of the pressure plates 220 is similar to the shape shown in FIG. 6. That is, each disk opposing surface 122 of the plurality of pressure plates 220 has a convex shape toward the disk 20.

The disk opposing surfaces 122 have a streamlined shape. Therefore, particles on the surface of the disk 20 can be effectively removed by the particle remover 200 as described above.

In particular, as shown in FIG. 7, the pressure plates 220 extend to an area near an inner circumference of the disk 20, that is, near a spindle motor 12 in the particle remover 200 according to the second embodiment of the present invention. Also, the width of the pressure plates 220 increases in a direction from the inner circumference to an outer circumference of the disk 20 to enhance the stiffness of the pressure plates 220.

According to the second embodiment of the present invention, the particle remover 200 as described above easily removes the particles from almost all surfaces of the disk 20, including the particles on the surface of the outer edge portion of the disk 20.

Figures 8, 9:
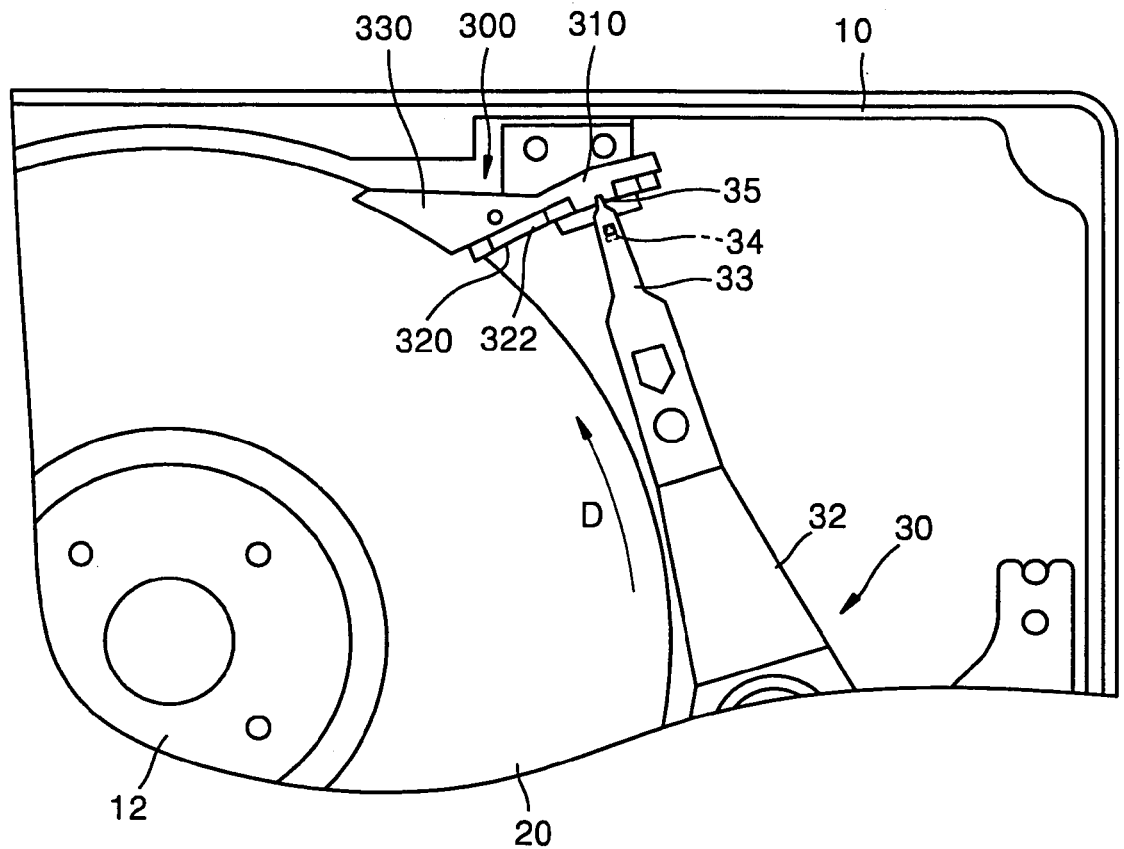
FIG. 8 is a plan view partially illustrating an HDD including a ramp having a particle remover according to a third embodiment of the present invention.
FIG. 9 is a perspective view of a magnified image of the ramp shown in FIG. 8.

FIG. 8 is a plan view partially illustrating a HDD with a ramp having a particle remover according to a third embodiment of the present invention. FIG. 9 is a perspective view of a magnified image of a ramp shown in FIG. 8.

Referring to FIGS. 8 and 9, a particle remover is integrally formed with a ramp 300 according to the third embodiment of the present invention. The ramp 300 parks the head by supporting the end-tap 35, which extends from an outer end of the suspension 33 of the actuator 30, when the disk drive stops operating, and removes the particles on the surface of the disk 20. The ramp 300 includes a fixed portion 310, supporting portions 320 to support the end-tap 35, and pressure plates 330 to remove the particles on the surface of the disk 20.

The fixed portion 310 is fixed and installed on the base plate 10 of the HDD by a screw 312 or by another coupling mechanism, and is disposed near the outer edge of the disk 20.

The supporting portions 320 extending from the fixed portion 310 toward the disk 20 respectively overlap an upper and a lower surface of the disk 20, and, in particular, overlap the surface of an outer edge portion of the disk 20, and respectively have a support surface 322 to which the end-tap 35 contacts when the disk 20 stops rotating. In addition, the supporting portions 320 are each installed above and below each disk 20.

The pressure plates 330 remove the particles attached to the surface of the disk 20. The pressure plates 330 extend from the fixed portion 310 toward the disk 20 and respectively overlap the upper and lower surfaces of each disk 20. Moreover, the pressure plates 330 overlap the surface of the outer edge of the disk 20. The number of pressure plates 330 then correspond to the number of disks 20.

Each disk opposing surface 332 of the pressure plates 330 is shaped similar to the disk opposing surfaces 122 shown in FIG. 6 to form a space between each disk opposing surface 332 and the surface of the disk 20 that becomes narrower and then wider along a rotational direction of the disk 20 (the direction indicated by arrow D). That is, the disk opposing surfaces 332 have a streamlined shape as described above.

When the HDD is turned off and the disk 20 stops rotating, the swing arm 32 rotates clockwise to remove the end-tap 35 from the disk 20 to the support surface 322 of the ramp 300. Thus, the head mounted on a slider 34 installed on the suspension 33 of the actuator 30 is parked at the ramp 300. On the other hand, when the HDD is turned on and the disk 20 starts rotating, the end-tap 35 moves from the support surface 322 of the ramp 300 to the disk 20 by rotation of the swing arm 32 to place the head on the surface of the disk 20. The air generated by rotation of the disk 20 flows between the disk opposing surfaces 332 and the surface of the disk 20 and, as described above, the pressure of the air changes and the speed at which the air flows increases. Accordingly, the particles on the surface of the disk 20, specifically, the particles attached to the surface of the outer edge portion, are effectively removed.

As described above, the fixed portion 310, the supporting portion 320, and the pressure plates 330 of the ramp 300 operate to park the head and remove the particles, and can be integrally formed using plastic injection molding. Thus, the manufacturing cost and complexity can be reduced, and handling and assembling are conveniently performed because these form a single unit.

As a result, the particles on the surface of the disk, specifically, the particles attached to the surface of the outer edge of the disk can be effectively removed because the air pressure changes between the pressure plates and the surface of the disk, and the speed at which the air flows increases. Therefore, the reliability of the HDD is improved because corruption and damage of the surface of the disk and the head by the particles are prevented.

Furthermore, if the particle removers described above are integrally formed with the ramp for parking the head, the manufacturing cost and complexity can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A data storage device, comprising:
a disk;
a head; and
a particle remover adjacent to the disk to remove particles attached to a surface of the disk, the particle remover placed downstream from the head and the particle remover comprising
a fixed portion installed on a base plate of the data storage device,
pressure plates extending from the fixed portion toward the disk and respectively overlapping an upper surface and a lower surface of the disk, the pressure plates having disk opposing surfaces with respective shapes that are convex toward the disk to form a space between the disk opposing surfaces and the surface of the disk that becomes narrower and then wider along a rotational direction of the disk.

2. The data storage device of claim 1, further comprising:
an actuator adjacent to the disk having the head; and
a ramp adjacent to the disk and the particle remover that parks the head when the disk stops rotating.

3. The data storage device of claim 1, wherein the particle remover removes particles attached to an outer surface of the disk.

4. The data storage device of claim 1, wherein the pressure plates extend from the fixed portion to an inner circumference of the disk to remove particles from approximately an entire surface of the disk.

5. The data storage device of claim 1, wherein the convex shape of the disk opposing surfaces causes a change in air pressure between the pressure plates and the upper surface and the lower surface of the disk and an increase in a speed of air flow to remove the particles attached to the disk.

6. The data storage device of claim 5, further comprising a filter to remove particles flowing in the air.

7. The data storage device of claim 1, wherein the disk opposing surfaces of the pressure plates have a streamlined shape.

8. The data storage device of claim 1, wherein the pressure plates overlap a surface of an outer edge of the disk.

9. The data storage device of claim 1, wherein the pressure plates extend to approach an inner circumference of the disk.

10. The data storage device of claim 9, wherein the pressure plates become wider in a direction from the inner circumference to an outer circumference of the disk.

11. The data storage device of claim 1, wherein the pressure plates and the fixed portion are integrally formed by plastic injection molding.

12. The data storage device of claim 1, wherein the pressure plates and the fixed portion are individually formed and then joined together.

13. The data storage device of claim 1, wherein the data storage device has a ramp to park the head.

14. The data storage device of claim 13, wherein the particle remover is installed near the ramp.

15. A data storage device comprising a head and a ramp that parks the head when a disk stops rotating, the ramp comprising:
- a fixed portion installed on a base plate of the data storage device;
- a supporting portion extending from the fixed portion toward the disk, overlapping an upper surface and a lower surface of an outer edge of the disk, and having a support surface contacting and supporting an end-tap of an actuator when rotation of the disk is stopped; and
- pressure plates extending toward the disk from the fixed portion and, overlapping the upper surface and the lower surface of the disk, and having disk opposing surfaces with shapes that are convex toward the disk to form a space between the disk opposing surfaces and the surface of the disk that becomes narrower and then wider along a rotational direction of the disk,
- wherein the pressure plates are placed downstream from the head.

16. The data storage device of claim 15, wherein the disk opposing surfaces of the pressure plates have a streamlined shape.

17. The data storage device of claim 15, wherein the pressure plates overlap the surface of the outer edge of the disk.

18. The data storage device of claim 15, wherein the pressure plates, the fixed portion and the supporting portion are integrally formed by plastic injection molding.

19. A data storage device, comprising:
- a plurality of disks;
- a head; and
- a particle remover adjacent to the plurality of disks to remove particles attached to surfaces of the disks, the particle remover placed downstream from the head and the particle remover comprising
  - a fixed portion installed on a base plate of the data storage device,
  - pressure plates extending from the fixed portion toward the disks and being interleaved with the disks, the pressure plates having disk opposing surfaces with respective shapes that are convex toward the disks to form a space between each of the disk opposing surfaces and the surfaces of the disks that becomes narrower and then wider along a rotational direction of the disk.

* * * * *